UNITED STATES PATENT OFFICE.

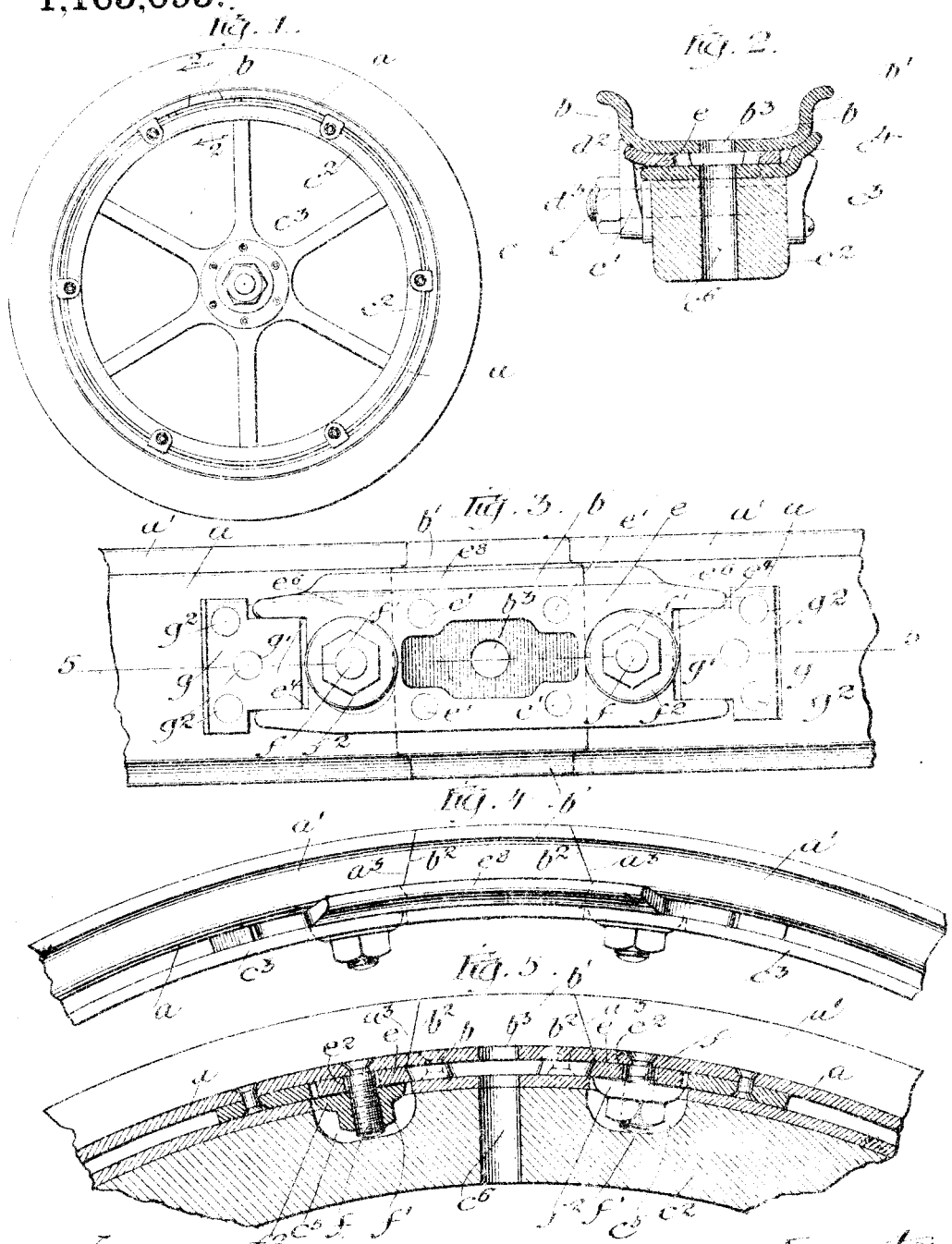

CHESTER C. HARBRIDGE, OF DETROIT, MICHIGAN, ASSIGNOR TO DETROIT DEMOUNTABLE RIM CO., OF DETROIT, MICHIGAN, A CORPORATION OF MICHIGAN.

DEMOUNTABLE RIM.

1,165,095.  Specification of Letters Patent.  Patented Dec. 21, 1915.

Application filed November 28, 1913. Serial No. 803,394.

*To all whom it may concern:*

Be it known that I, CHESTER C. HARBRIDGE, a resident of Detroit, in the county of Wayne and State of Michigan, have invented certain new and useful Improvements in Demountable Rims, of which the following is a full, clear, and exact description.

The invention relates to demountable rims and more particularly to that type of rim which is formed of a circular strip with a gap therein, so that its ends may be flexed and comprises a removable rim-section or filler-piece having tire-holding flanges corresponding to the tire-holding flanges on the rim.

The invention designs to provide improved locking-means for removably securing the filler-section to the rim so that the contiguous ends of said section and the main strip of the rim will be secured in accurate registry, to avoid cutting of the tire by any irregularity between the filler-section and rim ends.

Another object of the invention is to provide an improved locking device between the filler-section and the main strip of the rim, which will positively secure the rim ends against relative lateral and radial movement.

The invention consists in the several novel features hereinafter set forth and more particularly defined by claims at the conclusion hereof.

In the drawings: Figure 1 is a side elevation of a wheel embodying the invention. Fig. 2 is a section through the filler-section and the rim. Fig. 3 is a plan of a portion of the inner face of the rim and the filler-section. Fig. 4 is a side elevation of the parts shown in Fig. 3, the felly band being also shown. Fig. 5 is a section taken on the 5—5 of Fig. 3, the felly and felly band being also shown.

The improved rim comprises a main strip or split rim $a$ which is formed with a gap to receive a filler section $b$. Both the main strip $a$ and the filler-section $b$ are provided with correspondingly shaped integral tire-holding flanges so that when the filler-section is locked in the gap between the ends of strip $a$, they will form a continuous band for a pneumatic tire, the main strip $a$ being provided with integral side flanges $a'$, and the filler-section being provided with like flanges $b'$. The rim is adapted to seat upon a flange $c^4$ of a band $c^3$ which is fixed on the felly $c^2$ of the wheel. The rim is adapted to be removably secured on the wheel by bolts $c$ which are secured in felly $c^2$, and lugs $c'$ which fit in the space between the inner face of the rim $a$ and the outer face or periphery of band $c^3$ and are formed with portions $d^2$ for engaging one of the flanges $a'$ of the rim, the lugs being held by nuts $d^3$.

The ends of side-flanges $b'$ of filler-section $b$ are convergent or inclined as at $b^2$ and the ends of side-flanges $a'$ of the main strip $a$ are correspondingly inclined or convergent, as at $a^3$, so that these flanges of section $b$ will spread or wedge the rim ends apart as the filler-section is forced between the ends of the flanges $a'$ to cause the filler-section to fit snugly between the rim ends. By means of these inclined ends, a spreading tool for separating the rim-ends to receive the filler-section may, in most cases, be dispensed with, and the removal of the filler-section will be facilitated. A plate $e$ is secured to the inner face of filler-section $b$ by rivets $e'$ and is adapted to fit in the space between the inner face of the rim and the outer face or periphery of band $c^3$. This plate provides a firm bearing on the band for the filler-section, and projects longitudinally from the ends of the filler-section, as at $e^6$ to underlie the rim-ends.

For the purpose of locking the filler-section in place between the ends of the main strip and for forcing it outwardly between said ends, a screw $f$ is secured or welded in the base of each of the ends of the main strip $a$ and these extend inwardly from the base of the rim. Each of these screws is adapted to extend through a slot $e^2$ in one end of plate $e$. Each slot is elongated longitudinally of the rim to permit separation of the bolts $f$ by section $b$, and nuts $f'$ are adapted to clamp the projecting ends $e^6$ of plate $e$ against the inner face of the ends of strip $a$. Filler-section $b$ is provided with an opening $b^3$ for the tire valve. The projecting ends of plate $e$ are formed with recesses $e^4$ which are adapted to receive tongues $g'$ on plates $g$ which are riveted, as at $g^2$, to the inner face of the ends of the main rim strip $a$, respectively. Plates or lugs $g$ are also adapted to fit between the inner face of the rim and the outer face or periphery of band $c$. Tongues $g^3$, in the recesses on plates $e$, serve to secure the filler-section $b$ with its flanges $b^1$ in alinement with the corresponding flanges and base of the main strip and hold the rim ends against relative lateral movement. Plate $e$ is extended laterally, as at $e^8$ to underlie the joint between the rim $a$ and filler-section $b$ at that side of the rim which is not supported by the flange $c^1$ of the felly band. This projecting portion $e^8$ thus serves to support that portion of the rim which is adjacent the gap in the main strip $a$ and which overhangs the side of the felly-band at which the securing lugs are disposed and prevents the rim from being bent inwardly at these points.

The wheel-band $c$ and felly $c^2$ are cut away, as at $c^5$, to form recesses for receiving the nuts $f'$ and a hole $c^6$ extends through said band and felly for the tire-valve. Nuts $f'$ are provided with flanges $f^2$ which fit snugly in the hole $c^5$ in the band.

To place a tire on the rim, one end of the main strip $a$ will be placed on the inner portion of the tire and the other end may be sprung inwardly and contracted and then shifted into place on the tire so that the sides of the tire will rest in the channel of the rim, and the filler-section $b$ will then be placed in the gap between the ends of the main strip, screws $f$ being passed through main holes $e^2$ in plate $e$. Nuts $f'$ will then be tightened, the filler-section will be forced into the gap between the rim-ends and the latter will be wedged apart by the inclined edges of the side flanges $b'$. As the nuts $f'$ are tightened, slots $e^2$ will permit the screws to spread with the rim ends, and tongues $g'$ will pass into the recesses $e^4$ on the plate $e$. When the nuts have been tightened to firmly secure plate $e$ against the inner face of the strip $a$, the surfaces forming the rim channel will be flush, the filler-section will be locked in place and the interlock between the ends of plate $e$ and lugs $g$ will secure the filler-piece and the ends of the strip $a$ against relative lateral and radial movement. The rim with the tire thereon may safely be carried without danger of loss of the filler-piece. When the rim with the tire thereon is to be placed on the wheel, it is only necessary to place the rim in such angular relation to the wheel, that nuts $f'$ will pass into recesses $c^5$ and the rim may then be forced laterally on the wheel and secured thereon by lugs $d'$ and nuts $d^2$. When the tire is to be removed from the rim, the latter will first be removed from the wheel and then nuts $f$ will be loosened, the filler-section $e$ will be removed so that the ends of the main strip $a$ may be sprung inwardly and laterally of the tire to separate the rim from the tire.

The invention thus exemplifies an improved demountable rim in which the filler-piece or section is provided with inclined integral flanges for spreading the ends of the main strip to effect a snug fit between the contiguous edges of the filler-section and the ends of the main strip; also one in which the filler-strip will be rigidly secured in place by a plate which is rigid thereon and extends across the gap between the rim ends and which can be rigidly secured to the main strip independently of the tire, so that when the rim is being carried without a tire thereon, it will be firmly held in place; and also one in which this rigid plate is interlocked with the ends of the main strip to prevent relative lateral movement of the filler-section and the main strip.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A demountable tire rim comprising the combination of a main strip having a gap between its ends so that said ends may be flexed, a removable one-piece rim section fitting in and filling the space between said ends, the ends of the main strip and the filler-section being correspondingly tapered so that the filler-section will spread and fit snugly between the ends of the main strip when forced therebetween, and means secured to the ends of said main strip and engaging said filler-section for forcing the latter to position in said rim.

2. A demountable tire rim comprising the combination of a main strip having integral side flanges for engaging and holding a tire and having a gap between its ends so that they may be flexed, a one-piece rim section with integral side tire engaging flanges, fitting in and filling the space between said ends, the ends of the flanges on the main strip and the filler section being correspondingly tapered so that the filler-section will spread the ends of the main strip when forced therebetween, screw bolts on the rim-ends for detachably securing the filler-section to the main strip, and means for removably securing the rim on the body.

3. A demountable tire rim comprising the combination of a main strip having integral side flanges for holding a tire and a gap between its ends so that they may be flexed, a one-piece rim-section with integral side flanges for holding the tire, fitting in and filling the space between said ends, the ends of the flanges on the main strip and the filler-section being correspondingly tapered so that the filler-section will spread the ends of the main strip when forced therebetween, a plate rigidly secured to the inner face of the filler-section, and screw bolts on the ends of the main strip for detachably securing the filler-section to the main strip.

4. A demountable tire-rim comprising the combination of a main strip having a gap between its ends so that they may be flexed, a removable rim-section fitting in and filling the space between said ends, a locking-plate rigidly secured to the inner face of the filler-section and projecting from its ends, screws on the ends of the main strip, the projecting ends of said plate having slots therein for said screws and nuts for clamping the plate against the inner face of the ends of the main strip.

5. A demountable tire-rim comprising the combination of a main strip having a gap between its ends so that they may be flexed, a removable rim-section fitting in and filling the space between said ends, a locking-plate rigidly secured to the inner face of the filling section and projecting laterally from both ends thereof, means on the ends of the main strip for removably clamping the projecting ends of the plate thereto, lugs on the inner face of the rim ends, and an interlocking connection between said lugs and the ends of said plate for locking the filler-section and the ends of the main strip against relative lateral movement.

6. The combination with a wheel body, a demountable tire-rim comprising a main strip having a gap between its ends so that they may be flexed, a removable rim-section fitting in and filling the space between said ends, a plate rigidly secured to the inner face of the filler section, screws on the ends of the main strip adapted to extend through the projecting ends of said plate, nuts for clamping the plate against the inner face of the ends of the main strip, the wheel body having recesses therein adapted to receive and hold said nuts.

7. The combination with a wheel body having a band thereon, of a demountable tire-rim comprising a main strip having a gap between its ends so that they may be flexed, a removable rim-section fitting in and filling the space between said ends, said band having a seat at one side thereof for the rim, a locking plate rigidly secured to the inner face of the filler section and having one of its sides extended laterally to project beyond said band and support one of the ends of the main strip, and means for removably securing the plate to the ends of the main strip.

CHESTER C. BABRIDGE.

Witnesses: